United States Patent
Fletcher et al.

[15] 3,682,360
[45] Aug. 8, 1972

[54] BUMPER AND SPARE TIRE ASSEMBLY

[72] Inventors: Earl B. Fletcher, 6805 Specht St.; Almon L. Lawson, 6902 Marlow St., both of Bell Gardens, Calif. 90201

[22] Filed: Oct. 28, 1970

[21] Appl. No.: 84,836

[52] U.S. Cl. .........224/42.05, 224/42.06, 224/42.23, 280/150 B, 280/505, 280/511, 293/69 R, 293/73
[51] Int. Cl. .......B60r 9/00, B60r 19/02, B62d 43/04
[58] Field of Search..224/42.04, 42.05, 42.06, 42.22; 293/69 R, 73; 280/150 B, 505, 511

[56] References Cited

UNITED STATES PATENTS

| | | |
|---|---|---|
| 2,196,225 | 4/1940 | Morrison.................224/42.04 |
| 2,603,527 | 7/1952 | Perkins.................293/69 R X |
| 3,134,619 | 5/1964 | Harrison, Jr.............293/73 X |
| 3,488,077 | 1/1970 | Miller.........................293/73 |
| 3,547,469 | 12/1970 | Sancioni.................293/69 X |
| 3,580,613 | 5/1971 | Northrop.................293/73 X |
| 3,554,415 | 1/1971 | Woods....................224/42.05 |
| 3,323,667 | 6/1967 | Hall.....................224/42.06 X |
| 2,131,746 | 10/1938 | Morrison.............224/42.04 X |
| 2,717,798 | 9/1955 | Dodt et al....................293/66 |
| 2,028,945 | 1/1936 | Morrison.............224/42.04 X |
| 3,451,710 | 6/1969 | Savell........................293/73 |

*Primary Examiner*—Arthur L. La Point
*Assistant Examiner*—Howard Beltran
*Attorney*—Lyon & Lyon

[57] ABSTRACT

A rear bumper guard assembly for pick up trucks and the like having a removable center portion and a walled tray secured to the bumper guard behind said removable portion and adapted to hold a spare tire and tools.

10 Claims, 4 Drawing Figures

PATENTED AUG 8 1972　　3,682,360
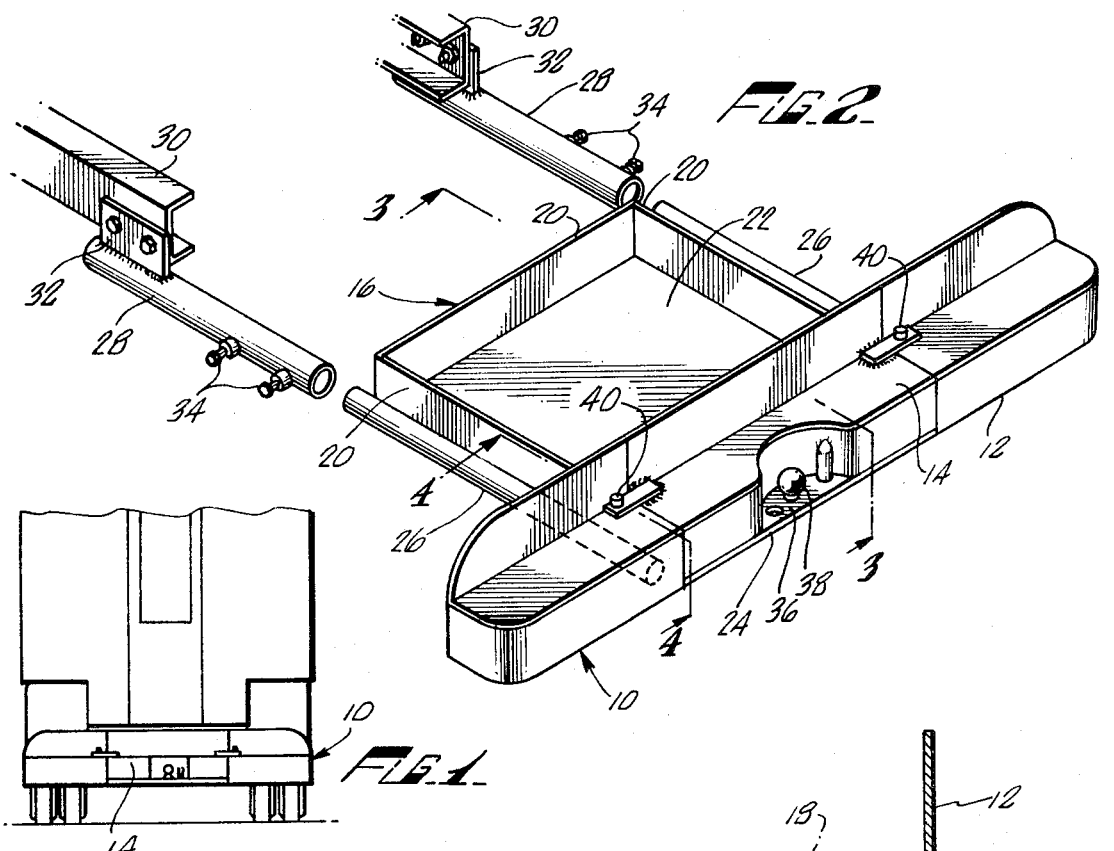
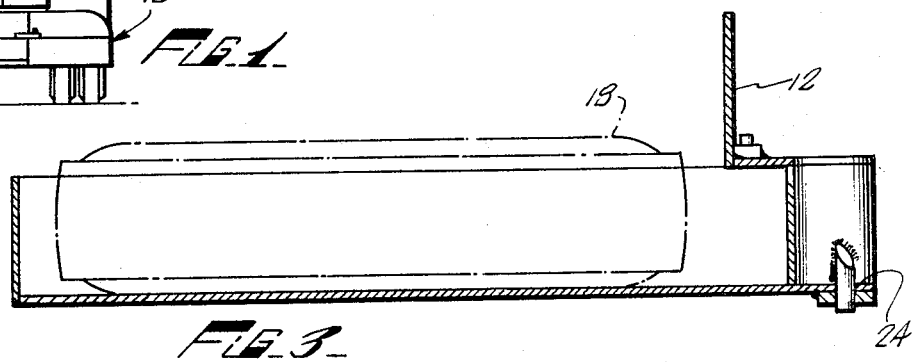
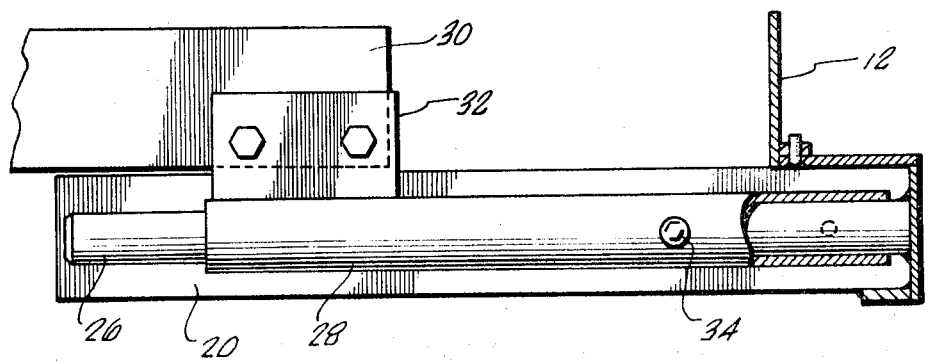
INVENTORS.
EARL B. FLETCHER
ALMON L. LAWSON
BY
Lyon & Lyon
ATTORNEYS.

BUMPER AND SPARE TIRE ASSEMBLY

BACKGROUND OF THE INVENTION

This invention relates to spare tire carriers for motor vehicles, particularly pick up trucks and the like, and more particularly to a rear bumper guard adapted for carrying the spare tire.

While many types of motor vehicles afford a convenient arrangement for the storage of and access to a spare tire, several are quite deficient in this regard. The pick up truck is a good example. The majority of pick up trucks have their spare tires mounted on a fixed rack disposed beneath the truck bed. Such an arrangement has several draw-backs, foremost of which is the danger involved to the individual in replacing or removing a tire from such a rack. Due to the placement of the rack, it is necessary for a person to crawl under the vehicle to gain access to the fastenings for removal and/or replacement of the tire. This obviously can be quite dangerous. Furthermore, due to the positioning of the rack and the nature of the fastening means used in securing the tire to the rack, it is quite easy for one to injure his hand or wrist in handling the tire under the truck. This is a result of the awkward angle at which one must work while removing the fastenings and lifting the heavy tire and wheel. This awkward and inaccessable placement, in addition to increasing the risk of harm to the individual changing the tire, creates a road hazard in that it increases the time necessary to change a tire thereby increasing the time the disabled vehicle remains on the side of the road. This increases the chance of collision between the stopped vehicle and another vehicle traveling on that road. Another draw-back to such a positioning of the spare tire is the extreme discomfort experienced by an individual in having to crawl under the truck to replace the tire, particularly, where the road is snow covered, muddy, or strewn with sharp rocks.

In addition to the awkward positioning of the spare tire described above, some pick up trucks mount the spare tire on the tailgate or inside the bed of the truck. In either case, the tire is subject to theft, malicious damage, the deliterious effect of the sun's rays, and in the latter event, taking up needed bed space as well.

It is therefore the principle object of this invention to provide a tire carrier which provides convenient access to a spare tire and the tools for changing the tire.

It is another object of the invention to provide a tire carrier in which the spare tire and tools are stored in a location which does not interfere with the space in a truck bed.

It is a further object of the invention to provide a tire carrier which affords a high degree of security and protection to the tire and tools.

It is yet a further object of the invention to provide a tire carrier which readily lends itself to use with a "utility" type of bumper, and which is equally susceptible to ready installation either at the time of manufacture or at a later period.

It is a still another object of this invention to provide a tire carrier which lends itself to use with camper bodies removably mounted on pick up trucks.

It is an additional object of the invention to provide a tire carrier which is compact, durable and rugged, yet which is relatively economical.

It is another object of the invention to provide a generally improved tire and tool carrier.

These and other objects and advantages of the present invention will become apparent from the following detailed description taken in conjunction with the accompanying drawings.

Briefly the tire support consists of a rear bumper guard assembly having a removable center portion giving access to a walled receptacle positioned behind the center portion and which tray is adapted to hold the spare tire and several tools.

IN THE DRAWINGS

FIG. 1 is a fragmentary rear elevational view of a pick up truck with a camper body mounted thereon embodying the spare tire carrier of the invention.

FIG. 2 is an isometric elevation of the bumper guard and spare tire support showing the receiving tubes secured to a vehicle frame.

FIG. 3 is a sectional view of the bumper guard and tire support taken along line 3—3 in FIG. 2.

FIG. 4 is a sectional view of the bumper guard and tire support, receiving tubes and vehicle frame taken along line 4—4 in FIG. 2.

Referring now in detail to the drawings, the bumper guard and spare tire support 10 is comprised of a rear bumper 12 having a removable center portion 14. The bumper is of the "utility" type, which is generally constructed from plate stock to form an especially sturdy and durable bumper guard, and as such is the type generally used on pick up trucks and the like. The removable center portion 14 is an integral part of bumper 12 which can be easily lifted from the remainder of the bumper, giving access to a receptacle 16, on which a spare tire 18 is placed. The receptacle is securely fastened to bumper 12 and is positioned immediately forward of center portion 14. The receptacle is provided with walls 20 for securely holding the spare tire therein. It should be noted that receptacle 16 is rectangular in shape, giving rise to additional usable space, about the tire 18 in the corners of the receptacle. This area can be used as a convenient place to store the various tools carried in the vehicle.

The tray 16 has floor section 22 upon which the spare tire rests. This floor section is on the same plane as the base portion 24 of rear bumper 12 with no obstructions therebetween, thereby allowing an individual in changing a tire to merely slide the spare tire off the receptacle, over the base of the bumper and onto the ground. This can be done with one hand and involves no lifting of the tire.

The bumper assembly 10 is secured to a vehicle, by two elongated slide members 26 which are adapted to be received by a pair of sleeves 28, as shown in FIG. 2. In the embodiment shown, both the slide members 26 and the sleeves 28 are tubular or rod-like in cross section. The slide members are welded or otherwise secured to bumper guard 12 in such a fashion as to form an extrmemly strong and durable connection. The slide members 26 are then placed in sleeves 28 which in turn are secured to the frame 30 of the vehicle. The sleeves are connected to the frame by means of fastening plates 32 which are welded onto the sleeves. The plates and supported sleeves are then bolted onto the frame, as shown in FIG. 2. In fastening the sleeves 28 onto the frame 30, the original holes used for mounting the factory bumper onto the frame can be used. This eliminates the necessity for having to drill new holes in the frame, and thereby possibly weakening the frame. The use of the slide members and sleeve members for securing the bumper assembly onto the vehicle allow the bumper to be adjusted for a particular vehicle. The distance which the bumper assembly protrudes from the rear of a vehicle is determined by the distance which the slide members are pushed into the sleeves. Locking pins 34 then lock the bumper assembly firmly in place, by extending through the sleeve members and penetrating into the slide members, thereby preventing any movement of the slide members within the sleeves. A slight variation of the method of securing the bumper guard assembly 10 to the vehicle consists of replacing the tubular or rod-like slide members 26 and sleeves 28 with channel members (not shown), wherein a pair of channels is held by and slides within a second pair of receiving channels, just as the slide members are held by and slide within the sleeves 28. The channels are secured to the bumper guard 12 and fastening plates 32 in the same manner as the slide members and sleeves.

The central portion 14 of the bumper assembly 10 has a recessed area 35 therein, thereby providing the assembly with a step 36. The step is adaptable to accommodate a trailer hitch 38 in the conventional manner. The central portion is also provided with locking mechanisms 40 to prevent the unauthorized removal of the central portion 14 and subsequent theft of the tire and tools.

Various changes and modifications may be made in carrying out the present invention without departing from the scope and spirit thereof. Insofar as these changes and modifications are within the preview of the appended claims they are to be considered as part of the invention.

What is claimed is:

1. A bumper guard and spare tire support assembly for a vehicle comprising: a bumper guard having a removable central portion, a rearwardly open receptacle having a bottom, front wall and side walls and adapted to hold a spare tire, the open rear of said receptacle being secured to said bumper guard and positioned forward of and adjacent to the removable central portion of said bumper guard and substantially aligned therewith so that upon removing said central portion, a spare tire can be slid from said receptacle, and means for fixedly securing said bumper guard and spare tire support assembly to a vehicle frame.

2. The assembly of claim 1 wherein said securing means comprises: a plurality of elongated slide members secured to said bumper guard, a corresponding number of sleeve members secured to the longitudinal channels of the frame of a vehicle and adapted to receive said slide members and locking means for securing said slide members within said sleeve members.

3. The combination of claim 2 wherein said locking means includes said sleeve members having a plurality of apertures therein, bolt means extending through said apertures and in threaded contact with said sleeve members, said bolt means having pointed male ends adapted for penetrating into said slide members, thereby securing said slide members within said sleeve members.

4. The combination of claim 3 wherein said receptacle is rectangular in shape and is provided with vertical front and side walls, said walls securing the spare tire within the receptacle.

5. The combination of claim 4 wherein said removable central portion has a recessed area therein, thereby providing said bumper guard with a step, said step being adapted to accommodate a trailer hitch.

6. The combination of claim 5 wherein means are provided for locking said removable central portion in place on said bumper guard.

7. The assembly of claim 1 wherein said securing means comprises a first plurality of channel members secured to said bumper guard, a corresponding number of second channel members secured to the frame of a vehicle and adapted to receive said first plurality of channel members and locking means for securing said first channel members within said second channel members.

8. The combination of claim 7 wherein said locking means includes said second channel members having a plurality of apertures therein, bolt means extending through said apertures and in threaded contact with said second channel members, said bolt means having pointed male ends adapted for penetrating into said first channel members, thereby securing said first channel members with said second channel members.

9. The combination of claim 8 wherein said receptacle is rectangular in shape and is provided with vertical front and side walls, said walls securing the spare tire within the receptacle.

10. The combination of claim 9 wherein means are provided for locking said removable central portion in place on said bumper guard.

* * * * *